(12) United States Patent
Djelassi

(10) Patent No.: US 11,466,626 B2
(45) Date of Patent: Oct. 11, 2022

(54) METHOD FOR CONTROLLING A TURBOMACHINE COMPRISING AN ELECTRIC MOTOR

(71) Applicant: SAFRAN AIRCRAFT ENGINES, Paris (FR)

(72) Inventor: Cedrik Djelassi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 26 days.

(21) Appl. No.: 17/282,370

(22) PCT Filed: Oct. 1, 2019

(86) PCT No.: PCT/EP2019/076660
§ 371 (c)(1),
(2) Date: Apr. 1, 2021

(87) PCT Pub. No.: WO2020/078720
PCT Pub. Date: Apr. 23, 2020

(65) Prior Publication Data
US 2021/0348569 A1    Nov. 11, 2021

(30) Foreign Application Priority Data

Oct. 18, 2018  (FR) ....................... 1859636

(51) Int. Cl.
*F02C 9/48* (2006.01)
*F02K 3/06* (2006.01)
(52) U.S. Cl.
CPC ............ *F02C 9/48* (2013.01); *F02K 3/06* (2013.01); *F05D 2220/323* (2013.01); *F05D 2270/051* (2013.01); *F05D 2270/335* (2013.01)
(58) Field of Classification Search
CPC ........... F05D 2220/76; F05D 2270/304; F05D 2220/323; F05D 2270/051;
(Continued)

(56) References Cited

U.S. PATENT DOCUMENTS

| 2005/0056021 A1* | 3/2005 | Belokon .............. F02C 9/32 60/734 |
| 2008/0276620 A1* | 11/2008 | Ullyott ............... F01D 21/06 60/773 |

(Continued)

FOREIGN PATENT DOCUMENTS

| EP | 990519 A2 * | 11/2008 | ............ F01D 21/06 |
| EP | 1990519 A2 | 11/2008 | |

(Continued)

OTHER PUBLICATIONS

Search Report from French Intellectual Property Office on corresponding FR application (FR1859636) dated Jul. 1, 2019.

(Continued)

*Primary Examiner* — Craig Kim
(74) *Attorney, Agent, or Firm* — Klein, O'Neill & Singh, LLP

(57) ABSTRACT

A method for controlling a turbomachine comprising an electric motor forming a torque injection device on a high-pressure rotation shaft, in which method a fuel flow setpoint $Q_{CMD}$ and a torque setpoint $TRQ_{CMD}$ provided at the electric motor are determined, the control method comprising: • a step of implementing a first fuel control loop in order to determine the fuel flow set point QCMD, • a step of implementing a second, torque control loop in order to determine the torque setpoint $TRQ_{CMD}$ comprising i. a step of determining a torque correction variable $\Delta TRQ_{CMD}$ as a function of a transitory speed setpoint NHTrajAccelCons, NHTrajDecelCons and ii. a step of determining the torque setpoint $TRQ_{CMD}$ as a function of the torque correction variable $\Delta TRQ_{CMD}$.

9 Claims, 7 Drawing Sheets

(58) Field of Classification Search
CPC ......... F05D 2270/052; F05D 2270/335; F02C 9/48; F02C 7/268; F02C 3/113; F02K 3/06

See application file for complete search history.

(56) References Cited

U.S. PATENT DOCUMENTS

| | | | |
|---|---|---|---|
| 2017/0226934 A1* | 8/2017 | Robie | F02C 7/32 |
| 2018/0178920 A1* | 6/2018 | Swann | F02K 5/00 |
| 2018/0372006 A1* | 12/2018 | Chalaud | F02C 9/38 |
| 2021/0348569 A1* | 11/2021 | Djelassi | F02K 3/06 |

FOREIGN PATENT DOCUMENTS

| | | | | |
|---|---|---|---|---|
| FR | 2962159 A1 * | 1/2012 | | F01D 21/00 |
| FR | 2962159 A1 | 1/2012 | | |
| WO | WO 2016/020618 A1 | 2/2016 | | |
| WO | WO-2016020618 A1 * | 2/2016 | | F01D 15/10 |
| WO | WO-2021181027 A1 * | 9/2021 | | |
| WO | WO-2022090173 A1 * | 5/2022 | | |

OTHER PUBLICATIONS

International Search Report and Written Opinion on corresponding PCT application (PCT/EP2019/076660) from International Searching Authority (EPO) dated Dec. 11, 2019.

* cited by examiner

METHOD FOR CONTROLLING A TURBOMACHINE COMPRISING AN ELECTRIC MOTOR

TECHNICAL FIELD

The present invention relates to a turbomachine for an aircraft, in particular the control of a turbomachine in order to provide the desired thrust as a function of the position of the aircraft pilot's control lever.

With reference to FIG. 1, a turbomachine 100 of the twin-spool turbofan engine type for an aircraft is schematically represented. In a known manner, turbomachine 100 comprises, from upstream to downstream in the direction of gas flow, a fan 110, a low-pressure compressor 111, a high-pressure compressor 112, a combustion chamber 113 which receives a fuel flow set point $Q_{CMD}$, a high-pressure turbine 114, a low-pressure turbine 115 and an exhaust primary nozzle 116. The low-pressure (LP) compressor 111 and the low-pressure turbine 115 are connected by a low-pressure shaft 121 and together form a low-pressure spool. The high-pressure (HP) compressor 112 and the high-pressure turbine 114 are connected by a high-pressure shaft 122 and, with the combustion chamber, together form a high-pressure spool. The fan 110, which is driven by the LP shaft 121, compresses the ingested air. This air is divided downstream of fan 110 into a secondary airflow which is directed directly towards a secondary nozzle (not represented) through which it is ejected to participate in the thrust provided by the turbomachine 100, and a so-called primary airflow which enters the gas generator, consisting of the low-pressure spool and the high-pressure spool, and is then ejected into the primary nozzle 116. In a known manner, to change the speed of turbomachine 100, the aircraft pilot changes position of a control lever which makes it possible to change the fuel flow set point $Q_{CMD}$ in the combustion chamber 113.

The design of a turbomachine 100 requires a sufficient margin to be taken into account against the so-called pumping phenomenon. This phenomenon, which results from an excessive incidence of the airflow on the vanes of one of the compressors, leads to large and rapid fluctuations in the pressure downstream of the related compressor and can lead to a shutdown of the combustion chamber 113. It further causes severe jolts on the compressor vanes and can thus lead to mechanical damage. Therefore its occurrence should be particularly avoided. The operation of a compressor in use is generally represented by a diagram which expresses the pressure ratio obtained between the outlet and the inlet, as a function of the air flow rate passing through it; this diagram is furthermore parameterized as a function of the rotation speed of the compressor. In this diagram there is a pumping line which is the maximum compression ratio limit that should not be exceeded, so as not to risk the occurrence of a pumping phenomenon. In a known manner, a so-called operating line is defined, which associates compression ratios obtained as a function of the flow rate, when the turbomachine 100 is in stabilized operation. Positioning this operating line is left to the discretion of the designer of the turbomachine 100 and the distance of this operating line from the pumping line represents the pumping margin. It should be noted that compressor efficiency (compression work provided to the air, relative to the work provided to rotatably drive it) is, to a first approximation, better the closer to the pumping line. On the other hand, accelerations required by the pilot from a stabilized operation (transient phase) to obtain an increase in thrust result at the compressor in a deviation of the operating point occurring towards the pumping line.

Indeed, an additional fuel injection into the combustion chamber 113 causes an almost instantaneous rise in the compression ratio, even though there is no time for the rotation speed to increase due to inertia. The variation in enthalpy brought to the fluid by the combustion of the added fuel then generates an increase in the work provided by each turbine and, consequently, an increase in the rotation speed of the corresponding spool. This results at the compressor diagram in a return of the operating point to the operating line when the speed stabilizes again, at an operating point which corresponds to a higher flow rate than that of the previous operating point.

The designer of a turbomachine 100 should therefore try to optimize the placement of the operating line by placing it as high as possible, so as to benefit from better efficiencies for its compressors, while keeping sufficient distance from the pumping line to allow safe accelerations.

In order to avoid any pumping phenomenon, a turbomachine 100 comprises a regulation system implemented by an electronic unit. With reference to FIG. 2, the regulation system comprises a stabilized management module 31, a transient intent detection module 32, a speed trajectory generation module 33, a selection module 34, an integration module 35 and a stop management module 36.

The stabilized management module 31 provides a correction quantity to the selection module 34 as a function of the difference between the speed NH of the turbomachine 100 and the set point speed $NH_{CONS}$. The set point speed $NH_{CONS}$ is proportional to the position of the control lever handleable by the aircraft pilot. Such a stabilized management module 31 is known to those skilled in the art and will not be set forth in more detail.

The purpose of the transient intent detection module 32 is to detect a transient intent desired by the pilot. The transient intent detection module 32 determines a difference between the speed NH of the turbomachine 100 and the set point speed $NH_{CONS}$. When the control lever remains in a constant position and the stabilized management module 31 is implemented, the actual speed NH of turbomachine 100 is stationary and equal to the set point speed $NH_{CONS}$. If the pilot moves the control lever, the set point speed $NH_{CONS}$ varies instantaneously. On the contrary, the speed NH does not vary instantaneously due to the inertia of turbomachine 100 and the stabilized management module 31. Thus, the transient intent detection module 32 detects a transient intent when the difference between the set point speed $NH_{CONS}$ and the actual speed NH is greater than a predetermined threshold S2.

In the case of an acceleration request, if the speed deviation is greater than the predetermined threshold S2 ($NH_{CONS}-NH>S2$), an acceleration request is detected. Similarly, in the case of deceleration, if the speed deviation is greater than the predetermined threshold S2 ($NH-NH_{CONS}>S2$), a deceleration request is detected. When a transient phase is detected, the transient intent detection module 32 generates an activation signal, which is transmitted to the speed trajectory generation module 33 and the selection module 34 as illustrated in FIG. 2.

In the case of an acceleration request, the speed trajectory generation module 33 determines a speed set point for acceleration (acceleration trajectory) $NH_{TRAJACC}$. Similarly, in the case of a deceleration, the speed trajectory generation module 33 determines a speed set point for deceleration (deceleration trajectory) $NH_{TRAJDECEL}$. As a function of the trajectory generated, the speed trajectory generation module 33 provides a correction quantity to the selection module 34.

Such a speed trajectory generation module 33 is known to those skilled in the art, in particular from patent application US2013/0008171 and patent application FR2977638A1, and will not be set forth in more detail.

In this example, when the selection module 34 receives an activation signal from the transient intent detection module 32, the selection module 34 selects the correction quantity from the stabilized management module 31 if no activation signal is received and selects the correction quantity from the speed trajectory generation module 33 in the case of receipt of an activation signal. Such a selection module 34 is known to those skilled in the art and will not be set forth in more detail. The selected correction quantity is provided to the integration module 35. The integration module 35 determines the fuel flow set point $Q_{CMD}$ by integrating the selected correction quantity.

The stop management module 36 limits the value of the fuel flow set point $Q_{CMD}$ determined by integration module 35. In a known manner, the stop management module 36 implements a so-called C/P stop known to those skilled in the art, in order to protect the turbomachine against pumping. In this example, the stop management module 36 enables stop set points in acceleration and deceleration to be defined. Such stops are known to those skilled in the art and will not be set forth in more detail.

The speed trajectory generation module 33 and the stop management module 36 enable an acceleration trajectory to be defined, which results in restricting the fuel flow set point $Q_{CMD}$ in order to avoid pumping. Such a regulation system is known from patent application FR2977638A1 and will not be set forth in more detail. Incidentally, it is known to protect an engine against pumping during transients by taking into account an acceleration set point during regulation (see for example U.S. Pat. No. 4,543,782 and US 2003/0094000).

With reference to FIG. 3, the set point speed $NH_{CONS}$, determined by the pilot's control lever, the predetermined acceleration trajectory $NH_{TRAJACC}$ and the current speed NH are represented in the upper part. In the lower part, the maximum stop fuel flow $Q_{MAX}$ (represented by a +++ line), the minimum stop fuel flow $Q_{MIN}$ (represented by a --- line), the fuel flow set point $Q_{CMD}$ (represented by a solid line) are represented.

When the pilot commands an acceleration of the speed $NH_{CONS}$, the current speed NH increases slowly with a delay, given that the current fuel set point $Q_{CMD}$ is limited by the maximum stop fuel flow $Q_{MAX}$ determined by the fuel stop module 36. In practice, saturation of $Q_{CMD}$ by $Q_{MAX}$ is not systematic and depends on the intensity of the acceleration imposed by the predetermined acceleration trajectory $NH_{TRAJACC}$ and the margin available for pumping. If this margin is not compatible with the degree of acceleration required to follow the speed trajectories then this leads to a limitation of $Q_{CMD}$ by $Q_{MAX}$—the current speed NH is not able to follow the acceleration trajectory $NH_{TRAJACC}$. A limitation has been set forth within the scope of an acceleration request in relation to pumping but the same applies to a deceleration request in relation to the margin with respect to the turbomachine shutdown.

In order to improve the response time of a turbomachine during a transient phase (acceleration, deceleration, etc.), it has been provided to equip the turbomachine with an electric motor in order to provide additional electrical torque to increase the speed of the turbomachine without leading to a pumping phenomenon. To this end, it is known from patent application WO2016/020618, a turbomachine for an aircraft comprising an electric motor to take power from the low-pressure shaft and inject power into the high-pressure shaft.

One of the purposes of the present invention is to enable the electrical torque provided by the electric motor to be regulated optimally in order to optimize the response time of the turbomachine while ensuring sufficient pumping margin and limiting power consumption of the electric motor.

SUMMARY

To this end, the invention relates to a method for controlling a turbomachine comprising a fan positioned upstream of a gas generator and delimiting a primary airflow and a secondary airflow, the primary airflow passing through said gas generator which comprises a low-pressure compressor, a high-pressure compressor, a combustion chamber, a high-pressure turbine and a low-pressure turbine, said low-pressure turbine being connected to said low-pressure compressor by a low-pressure rotation shaft and said high-pressure turbine being connected to said high-pressure compressor by a high-pressure rotation shaft, the turbomachine comprising an electric motor forming a torque injection device on the high-pressure rotation shaft, a method wherein a fuel flow set point $Q_{CMD}$ in the combustion chamber and a torque set point $TRQ_{CMD}$ provided to the electric motor are determined, the control method comprising:

a step of implementing a first fuel regulation loop in order to determine the fuel flow set point $Q_{CMD}$ comprising:
  i. a step of detecting a speed transient intent TopAccel, TopDecel as a function of a difference between a current speed NH and a determined set point speed $NH_{CONS}$,
  ii. a step of determining a transient speed set point NHTrajAccelCons, NHTrajDecelCons,
  iii. a step of determining a fuel correction quantity $\Delta Q_{CMD}$ as a function of the transient speed set point NHTrajAccelCons, NHTrajDecelCons; and
  iv. a step of determining the fuel flow set point $Q_{CMD}$ as a function of the fuel correction quantity $\Delta Q_{CMD}$ a step of implementing a second torque regulation loop in order to determine the torque set point $TRQ_{CMD}$ comprising
  i. a step of determining a torque correction quantity $\Delta TRQ_{CMD}$ as a function of the transient speed set point NHTrajAccelCons, NHTrajDecelCons, and
  ii. a step of determining the torque set point $TRQ_{CMD}$ as a function of the torque correction quantity $\Delta TRQ_{CMD}$.

By virtue of the invention, the second torque regulation loop makes it possible to act jointly with the first fuel loop when the latter is limited in its regulation, in particular, due to limitations to avoid pumping or shutdown of the turbomachine. Thus, the current speed of the turbomachine can reactively follow the trajectory set point. The operability of the turbomachine is thus improved.

In addition, the second torque regulation loop advantageously allows the pumping and shutdown limits of the turbomachine to be extended to allow better regulation of the fuel set point. In other words, the second torque regulation loop advantageously makes it possible to improve the first fuel regulation loop. Advantageously, the second torque regulation loop does not replace the first fuel regulation loop but supports it when operating limits are reached. This means that the fundamental principles of speed regulation are not disrupted, ensuring reliable regulation.

Preferably, the control method comprises:
  during the step of implementing the first fuel regulation loop, a step of detecting a fuel set point stop TopButeeAccel, TopButeeDecel,
  during the step of implementing the second torque regulation loop, a step of zero resetting the torque set point $TRQ_{CMD}$, the step of zero resetting the torque set point $TRQ_{CMD}$ being inhibited in the case of detection of a speed transient intent TopAccel, TopDecel and detection of a fuel set point stop TopButeeAccel, TopButeeDecel.

Advantageously, the control method comprises a step of zero resetting the torque set point $TRQ_{CMD}$ which is implemented continuously but is inhibited when the fuel set point regulation limits are reached. In other words, the electrical torque is not used continuously to avoid excessive power consumption. The electrical torque is injected onto the high-pressure shaft when the fuel set point regulation limits are reached (pumping, shutdown, etc.) to allow them to be extended. In other words, when injected, the electrical torque provides a regulation margin to the first fuel regulation loop. Once this margin has been obtained, the torque set point $TRQ_{CMD}$ can be, in particular gradually, zero reset.

Preferably, the torque set point $TRQ_{CMD}$ is gradually zero reset, preferably according to at least one reduction gradient. Gradual zero resetting is opposed to abrupt zero resetting, which would induce disturbances in the turbomachine speed. Gradual zero resetting according to a reduction gradient makes it possible to control the speed at which the second torque regulation loop decreases its influence in order to allow the first fuel regulation loop to regain its influence.

Preferably, the reduction gradient is a function of the response time of the first fuel regulation loop. In other words, the zero reset speed is optimal since it is determined as a function of the first fuel regulation loop. Thus, a decrease in the influence of the second torque regulation loop is directly compensated for by the first fuel regulation loop.

Advantageously, the control method comprises a step of doubly integrating the torque correction quantity $\Delta TRQ_{CMD}$ in order to determine the torque set point $TRQ_{CMD}$. Double integration is advantageous given that it ensures a permanent zero speed error and thus a predetermined acceleration or deceleration time.

Preferably, the torque set point $TRQ_{CMD}$ is bounded between a maximum torque value $TRQ_{max}$ determined by the structure of the electric motor ME and a minimum torque value $TRQ_{min}$ determined by the structure of the electric motor ME.

The invention also relates to a computer program comprising instructions for executing the steps of a control method as previously set forth when said program is executed by a computer. The invention also relates to a medium for recording said computer program. The above-mentioned recording medium may be any entity or device capable of storing the program. For example, the medium may comprise a storage medium, such as a ROM, for example a CD ROM or a microelectronic circuit ROM, or a magnetic recording medium, for example a hard disk. On the other hand, recording media may correspond to a transmissible medium such as an electrical or optical signal, which may be carried by an electrical or optical cable, by radio or by other means. The program according to the invention may be downloaded in particular on an Internet-type network. Alternatively, the recording media may correspond to an integrated circuit into which the program is incorporated, the circuit being adapted to execute or to be used in executing the method in question.

The invention also further relates to an electronic control unit for a turbomachine comprising a memory comprising instructions from a computer program as set forth above.

The invention also relates to a turbomachine comprising an electronic unit as set forth above.

BRIEF DESCRIPTION OF THE DRAWINGS

The invention will be better understood upon reading the following description, given only by way of example, and referring to the appended drawings in which.

It should be noted that the figures disclose the invention in a detailed manner in order to implement the invention, said figures may of course be used to better define the invention if necessary.

DETAILED DESCRIPTION

Figure 1:
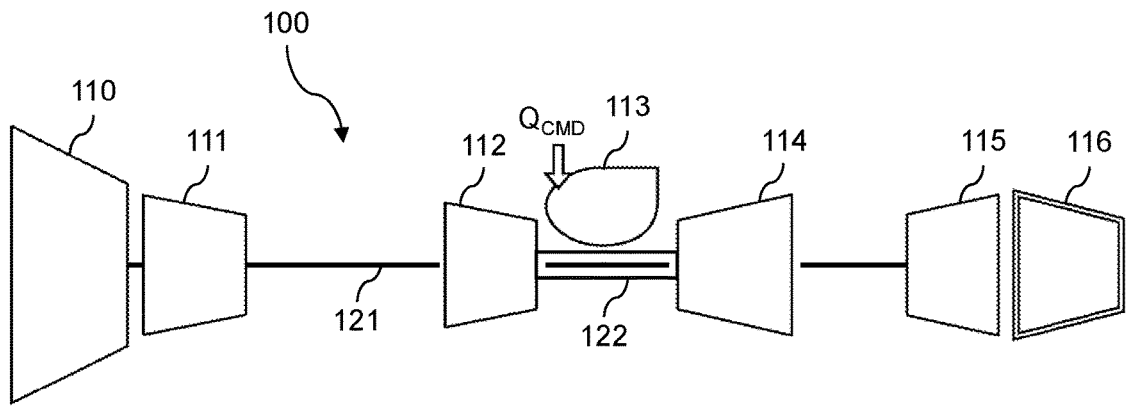
FIG. 1 is a schematic representation of a turbomachine according to prior art.
Figure 2:
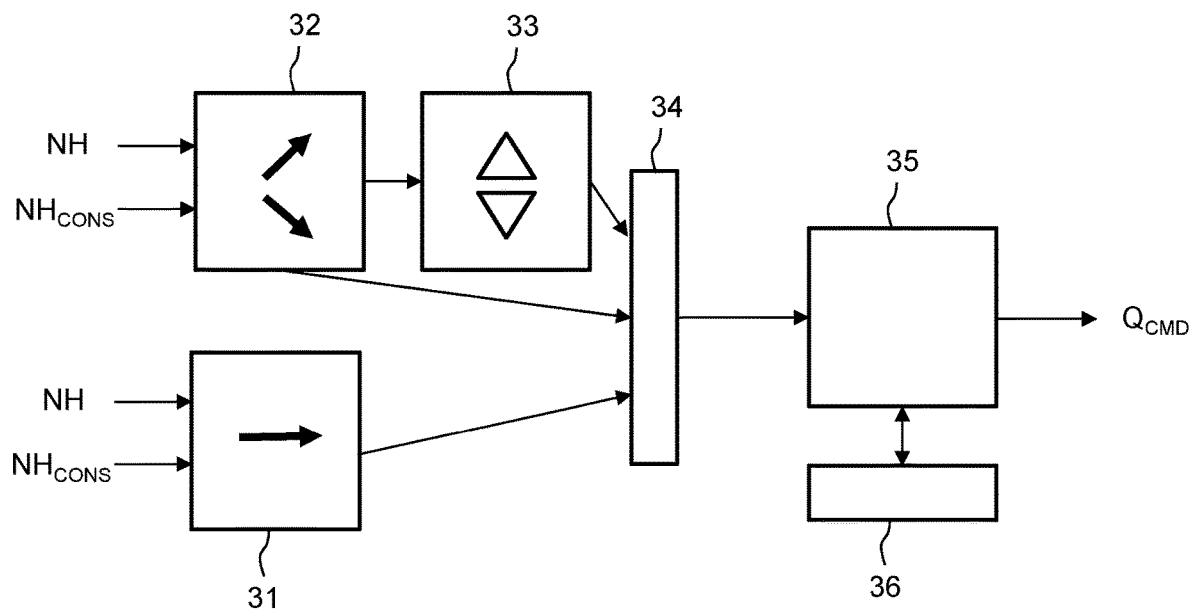
FIG. 2 is a schematic representation of a fuel flow set point regulation system according to prior art.
Figure 3:
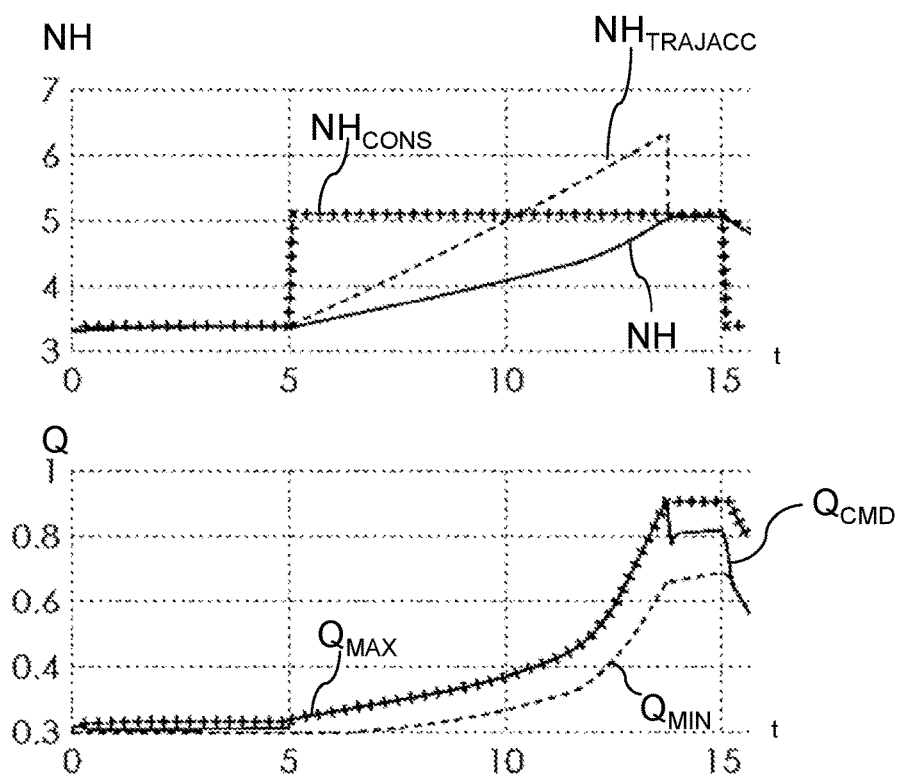
FIG. 3 is a schematic representation of the increase in engine speed and the fuel flow set point as a result of a pilot's acceleration command according to prior art.
Figure 4:
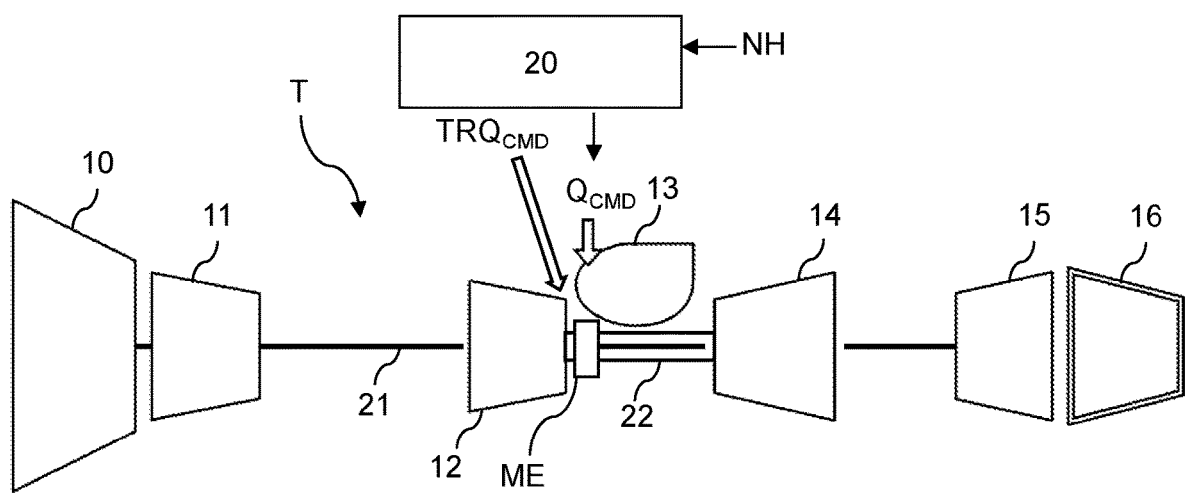
FIG. 4 is a schematic representation of a turbomachine according to an embodiment of the invention.

With reference to FIG. 4, a turbomachine T of the twin-spool turbofan engine type for an aircraft is schematically represented. In a known manner, the turbomachine T comprises, from upstream to downstream in the direction of gas flow, a fan 10, a low-pressure compressor 11, a high-pressure compressor 12, a combustion chamber 13 which receives a fuel flow set point $Q_{CMD}$, a high-pressure turbine 14, a low-pressure turbine 15 and an exhaust primary nozzle 16. The low-pressure (LP) compressor 11 and the low-pressure turbine 15 are connected by a low-pressure shaft 21 and together form a low-pressure spool. The high-pressure (HP) compressor 12 and the high-pressure turbine 14 are connected by a high-pressure shaft 22 and, with the combustion chamber 13, together form a high-pressure spool. Fan 10, which is driven by the LP shaft 21, compresses the ingested air. This air is divided downstream of the fan into a secondary airflow which is directed directly towards a secondary nozzle (not represented) through which it is ejected to participate in the thrust provided by the turbomachine 100, and a so-called primary airflow which enters the gas generator, consisting of the low-pressure spool and the high-pressure spool, and is then ejected into the primary nozzle 16. In a known manner, to change the speed of the turbomachine T, the aircraft pilot changes the position of a control lever which allows the fuel flow set point $Q_{CMD}$ in the combustion chamber 13 to be changed.

With reference to FIG. 4, turbomachine T further comprises an electric motor ME configured to provide additional torque to the high-pressure shaft 22. The operation of the turbomachine T is controlled by an electronic unit 20 which obtains signals representing operating parameters of the turbomachine T, especially the speed NH of the turbomachine T, to provide the fuel flow set point $Q_{CMD}$ and a torque set point $TRQ_{CMD}$ to the electric motor ME.

Figure 5:
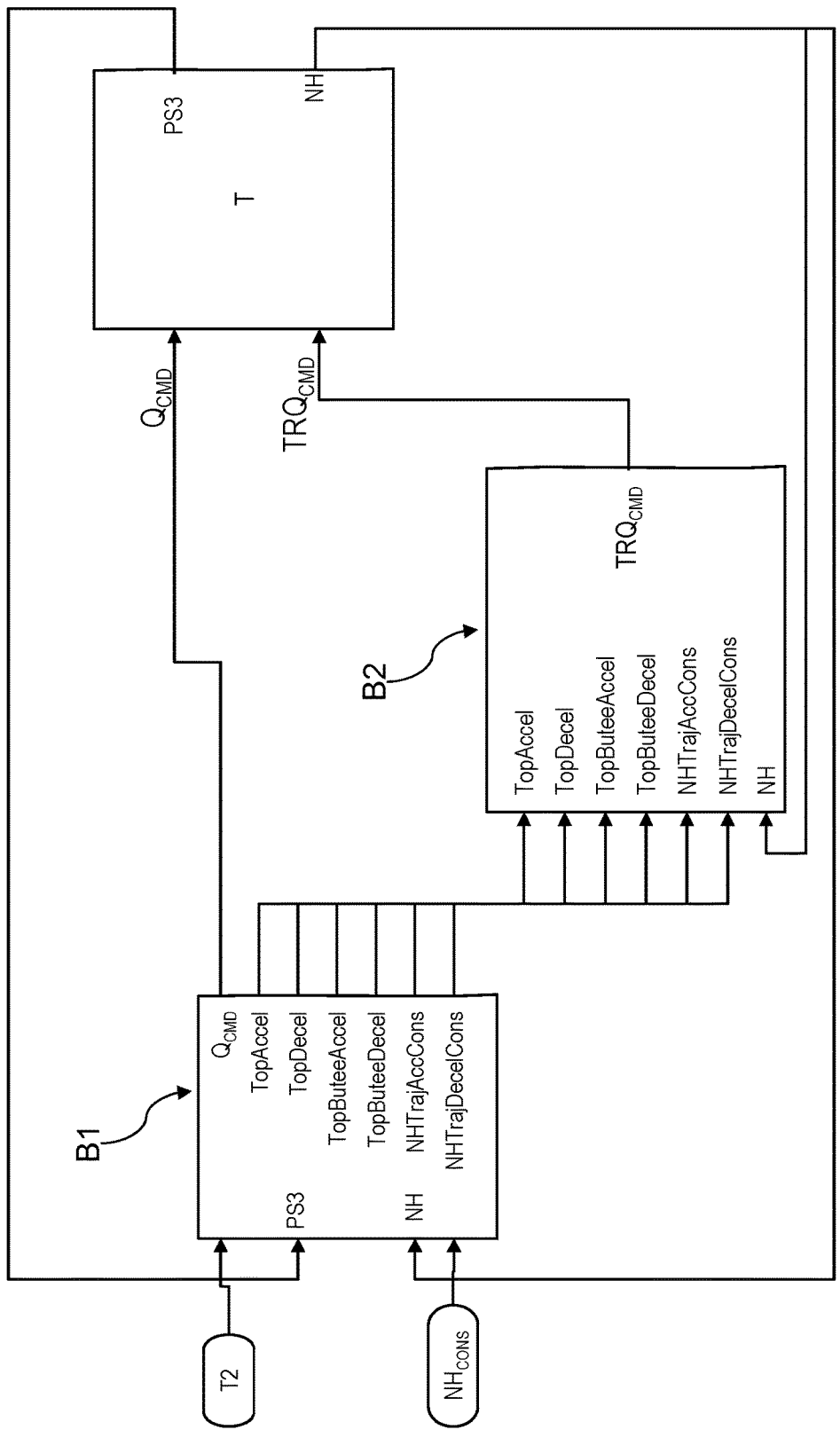
FIG. 5 is a schematic representation of a fuel flow set point and torque set point regulation system according to the invention.

As illustrated in FIG. 5, the electronic unit 20 comprises a regulation system comprising a first fuel flow set point $Q_{CMD}$ regulation loop B1, hereinafter referred to as "first fuel loop B1", and a second electrical torque set point $TRQ_{CMD}$ regulation loop B2, hereinafter referred to as "second torque loop B2".

As illustrated in FIG. 5, the first fuel loop B1 comprises:
a speed NH input of the turbomachine T
a set point speed $NH_{CONS}$ input defined by the position of the control lever handleable by the aircraft pilot,
a fuel flow set point $Q_{CMD}$ output transmitted to the turbomachine T and
a plurality of output indicators:
an indicator of an acceleration transient request TopAccel
an indicator of a deceleration transient request TopDecel
an indicator of an acceleration stop TopButeeAccel defined by the saturation of the control of the correctors by the acceleration C/P stop
an indicator of a deceleration stop TopButeeDecel defined by the saturation of the control of the correctors by the shutdown C/P stop
a speed trajectory set point for acceleration NHTrajAccelCons
a speed trajectory set point for deceleration NHTrajDecelCons Still with reference to FIG. 5, the second torque loop B2 receives as an input all the output indicators generated by the first fuel loop B1, that is TopAccel, TopDecel, TopButeeAccel, TopButeeDecel, NHTrajAccelCons, NHTrajDecelCons, as well as the speed NH input of the turbomachine T. Advantageously, by virtue of this regulation system, the second torque loop B2 makes it possible to provide a torque set point $TRQ_{CMD}$ being adaptive as a function of the behavior of fuel loop B1, which remains a priority.

In this example, the first fuel loop B1 also comprises a static pressure input to the combustion chamber PS3.

The structure and operation of each loop B1, B2 will now be set forth in detail.

First Fuel Regulation Loop B1

Figure 6:
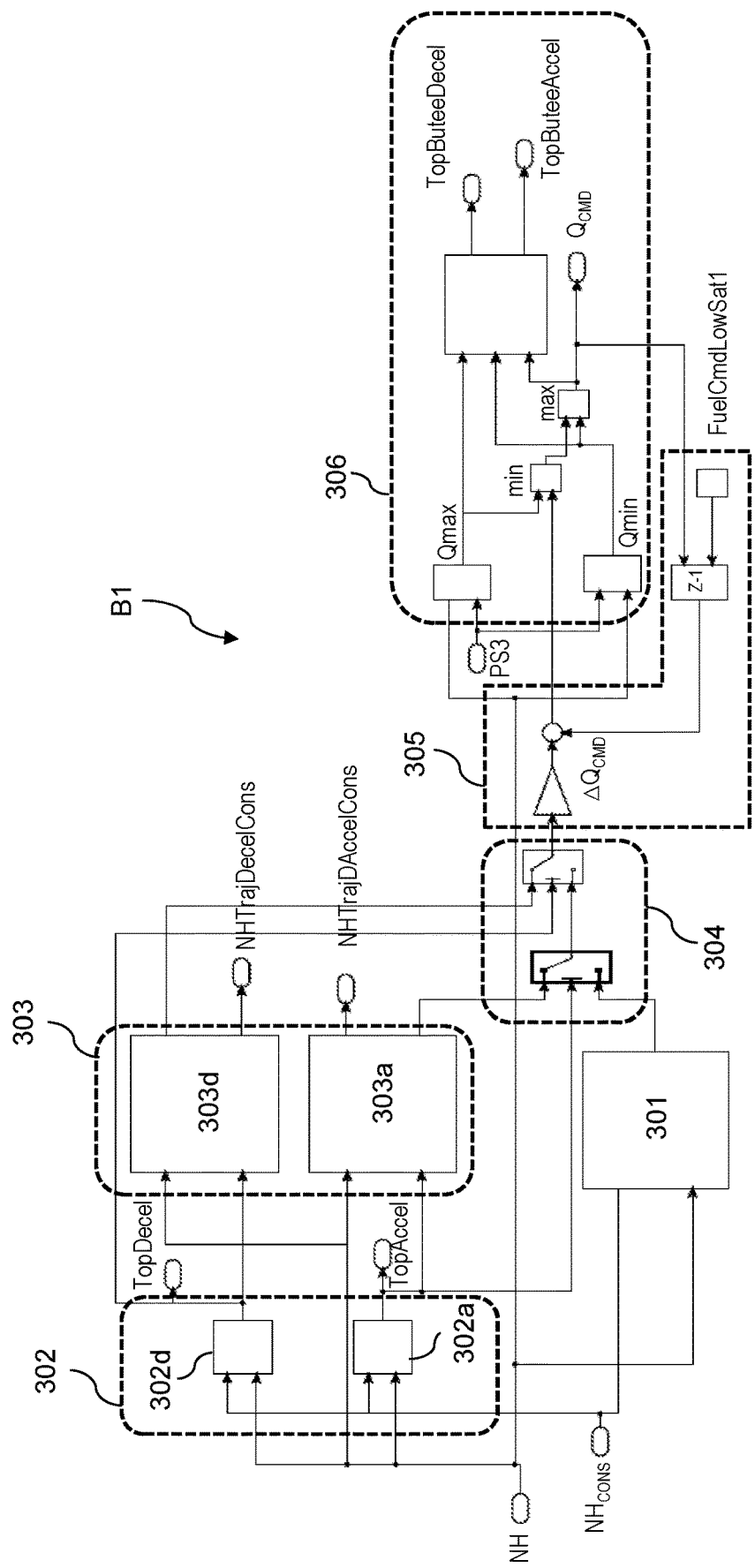
FIG. 6 is a schematic representation of a first fuel regulation loop of the regulation system of FIG. 5.

In a known manner, with reference to FIG. 6, the first fuel loop B1 comprises a stabilized management module 301, a transient intent detection module 302, a speed trajectory generation module 303, a selection module 304, an integration module 305 and a stop management module 306 which fulfills a saturation function of the integration and therefore of the fuel control $Q_{CMD}$.

As will be set forth later, the speed trajectory generation module 303 is also configured to generate a command for the control of this trajectory.

The stabilized management module 301 provides a correction quantity to the selection module 304 as a function of the difference between the speed NH of the turbomachine T and the set point speed $NH_{CONS}$. Such a stabilized management module 301 is known to those skilled in the art and will not be set forth in more detail.

The purpose of the transient intent detection module 302 is to detect a transient intent desired by the pilot. The transient intent detection module 302 determines a difference between the speed NH of the turbomachine T and the set point speed $NH_{CONS}$. When the control lever remains in a constant position and the stabilized management module 301 is implemented, the actual speed NH of the turbomachine T is stationary and equal to the set point speed $NH_{CONS}$. If the pilot moves the control lever, the set point speed $NH_{CONS}$ varies instantaneously. On the contrary, the speed NH does not vary instantaneously due to the inertia of the turbomachine T and the stabilized management module 301. Thus, the transient intent detection module 302 detects a transient intent when the difference between the set point speed $NH_{CONS}$ and the actual speed NH is greater than a predetermined threshold S3.

According to the invention, the transient intent detection module 302 also provides an indicator of acceleration transient request TopAccel and an indicator of deceleration transient request TopDecel. In the case of acceleration, if the speed deviation is greater than the predetermined threshold S3 ($NH_{CONS}$−NH>S3), the indicator of acceleration transient request TopAccel is activated. This function is implemented in an acceleration sub-module 302a which is a comparator. Similarly, in the case of deceleration, if the speed deviation is greater than the predefined threshold S3 (NH−$NH_{CONS}$>S3), the indicator of deceleration transient request TopDecel is activated. This function is implemented in a deceleration sub-module 302d which is a comparator. By way of example, the threshold S3 is 200 rpm.

When a transient phase is detected, the transient intent detection module 302 generates an activation signal, which is transmitted to the speed trajectory generation module 303 and the selection module 304 as illustrated in FIG. 6.

In the case of acceleration, the speed trajectory generation module 303 determines a speed set point for acceleration (acceleration trajectory) NHTrajAccelCons. Similarly, in the case of deceleration, the speed trajectory generation module 303 determines a speed NH set point for deceleration (deceleration trajectory) NHTrajDecelCons. Such a speed trajectory generation module 303 is known to those skilled in the art and will not be set forth in more detail. In addition, the generation module 303 is also configured to generate a correction quantity that allows the trajectory set point to be followed if necessary.

In this example, when the selection module 304 receives an activation signal from the transient intent detection module 302, the selection module 304 selects the correction quantity from the stabilized management module 301 if no activation signal is received and selects the correction quantity from the speed trajectory generation module 303 in the case of receipt of an activation signal. Such a selection module 304 is known to those skilled in the art and will not be set forth in more detail.

The selected fuel correction quantity $\Delta Q_{CMD}$ is provided to the integration module 305. The integration module 305 determines the fuel flow set point $Q_{CMD}$ by integrating the fuel correction quantity $\Delta Q_{CMD}$.

The stop management module 306 limits the value of the fuel flow set point $Q_{CMD}$ determined by the integration module 305. In a known manner, the stop management module 306 implements a so-called C/P stop, known to those skilled in the art. In this example, the stop management module 306 allows definition of stop set points in acceleration and deceleration. For this purpose, in the case of acceleration, the stop management module 306 allows definition of an indicator of saturation of the control of the correctors by the acceleration C/P stop TopButeeAccel. Similarly, in the case of deceleration, the stop management module 306 allows definition of an indicator of saturation of the control of the correctors by the shutdown C/P stop TopButeeDecel. Such stops are known to those skilled in the art and will not be set forth in more detail. Preferably, the stop management module 306 determines the stops as a function of the static pressure in the combustion chamber PS3 and the speed NH (high-pressure spool speed).

As previously indicated, such a regulation is optimal for limiting the fuel set point $Q_{CMD}$ transmitted to turbomachine T but induces significant response times.

To eliminate this drawback, a second torque loop B2 is coupled to the first fuel loop B1 to determine an optimum torque set point $TRQ_{CMD}$. For this purpose, unlike prior art, the first fuel loop B1 communicates to the second torque loop B2 the various output indicators: TopAccel, TopDecel, $NHTrajAccelCons$, $NHTrajDecelCons$, TopButeeAccel, TopButeeDecel.

Second Torque Regulation Loop B2

The aim of the second torque regulation loop B2 is to use the electric motor ME sparingly. Thus, a torque set point $TRQ_{CMD}$ is activated only when the trajectories are limited (TopButeeAccel or TopButeeDecel) and the deviation between the $NH_{CONS}$ speed set point and the actual speed NH indicates a need for activating the transient controls (TopAccel or TopDecel). In other words, a torque set point $TRQ_{CMD}$ is only activated when the fuel set point $Q_{CMD}$ is restricted within its operating range.

As will be set forth later, the electrical torque $TRQ_{CMD}$ provided allows the operating point to be deviated from the operating limits and thus provides the control margin to adapt the fuel set point $Q_{CMD}$ again. By virtue of the invention, the first fuel loop B1 and the second torque loop B2 are interchanged to improve operability of the turbomachine T (response time, etc.) while at the same time limiting power consumption by the electric motor ME.

Figure 7:
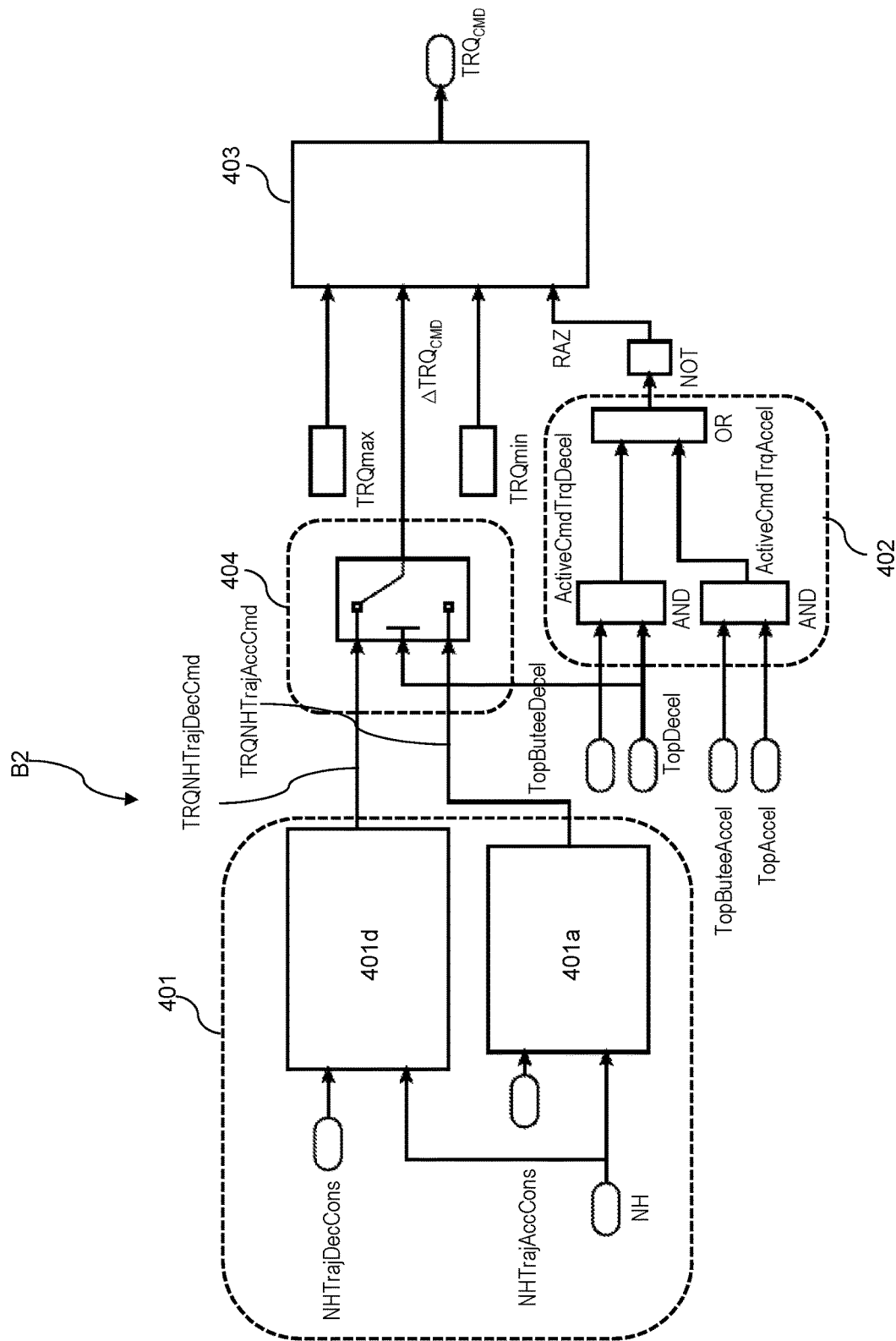
FIG. 7 is a schematic representation of a second torque regulation loop of the regulation system of FIG. 5.

With reference to FIG. 7, the second torque regulation loop B2 comprises a command determination module 401, a zero reset module 402, an integration module 403 and a switch 404.

The command determination module 401 comprises:
a current speed NH input of the turbomachine
the speed NH set point for acceleration (acceleration trajectory) NHTrajAccelCons providing a set point quantity for the torque command
the speed NH set point for deceleration (deceleration trajectory) NHTrajDecelCons providing a set point quantity for the torque command.

The command determination module 401 comprises a deceleration sub-module 401*d* and an acceleration sub-module 401*a* which are respectively configured to calculate a torque command for acceleration (acceleration torque) TRQTrajAccelCmd and a torque command for deceleration (deceleration torque) TRQTrajDecelCmd.

In this example, the acceleration sub-module 401*a* calculates a correction quantity, of the second derivative type, for acceleration (acceleration torque) TRQTrajAccelCmd as a function of the speed NH set point for acceleration (acceleration trajectory) NHTrajAccelCons, and the current speed NH input. Preferably, the acceleration sub-module 401*a* is in the form of an integral dual-integrator type corrector that fulfills the following transfer function:

$$RC_{NHTrans}(p) = K_{NH}^{-1} \cdot \frac{(1 + \tau_{NH} \cdot p)(1 + \tau_{Transit} \cdot p)}{\tau_{BF} \cdot \tau_{Transit} p^2}$$

in which function:
K is a predetermined inverse constant and
$\tau_{NH}$, $\tau_{Transit}$ and $\tau_{BF}$ are predetermined time constants.

The structure of such an acceleration sub-module 401*a* is known to the those skilled in the art. The structure and function of the deceleration sub-module 401*d* are analogous.

With reference to FIG. 7, the selection of the command before integration by the integration module 403 is performed by a switch 404 in order to select the deceleration command in deceleration or the acceleration command in acceleration.

The zero reset module 402 comprises a plurality of input indicators from the first fuel loop B1:
the indicator of an acceleration transient request TopAccel
the indicator of a deceleration transient request TopDecel
the indicator of an acceleration stop TopButeeAccel defined by the saturation of the control of the correctors by the acceleration C/P stop
the indicator of a deceleration stop TopButeeDecel defined by the saturation of the control of the correctors by the shutdown C/P stop.

The aim of the zero reset module 402 is to zero reset the torque set point $TRQ_{CMD}$. As will be set forth later, zero resetting is not abrupt but gradual. The zero reset module is implemented continuously. Nevertheless, zero resetting is inhibited:
when an acceleration is requested and when the acceleration stop is already reached (TopAccel and TopButeeAccel activated) or
when deceleration is requested and when the deceleration stop is already reached (TopDecel and TopButeeDecel activated).

When the fuel set point $Q_{CMD}$ of the first fuel loop B1 wants to deviate from the allowed operating range, the zero reset module 402 is not zero reset. Thus, the torque set point $TRQ_{CMD}$ enables the operating point to deviate from the operating limits. zero resetting the torque set point $TRQ_{CMD}$ is only initiated when regulation by the fuel set point $Q_{CMD}$ is possible.

In other words, the second torque loop B2 acts synergistically with the first fuel loop B1. The second torque loop B2 supports the first fuel loop B1. In a stabilized speed, the torque set point $TRQ_{CMD}$ is thus zero reset to limit power consumption and improve efficiency.

With reference to FIG. 7, the integration module 403 comprises:
a correction input receiving a torque correction quantity $\Delta TRQ_{CMD}$ from switch 404
a maximum torque value $TRQ_{max}$ determined by the structure of the electric motor ME
a minimum torque value $TRQ_{min}$ determined by the structure of the electric motor ME
a zero reset RAZ input provided by the zero reset module 402
a torque set point $TRQ_{CMD}$ output.

In this example, the integration module 403 is a double integrator, in order to integrate the torque correction quantity $\Delta TRQ_{CMD}$. This ensures a permanent zero speed error and thus a predetermined acceleration or deceleration time.

Figure 8:
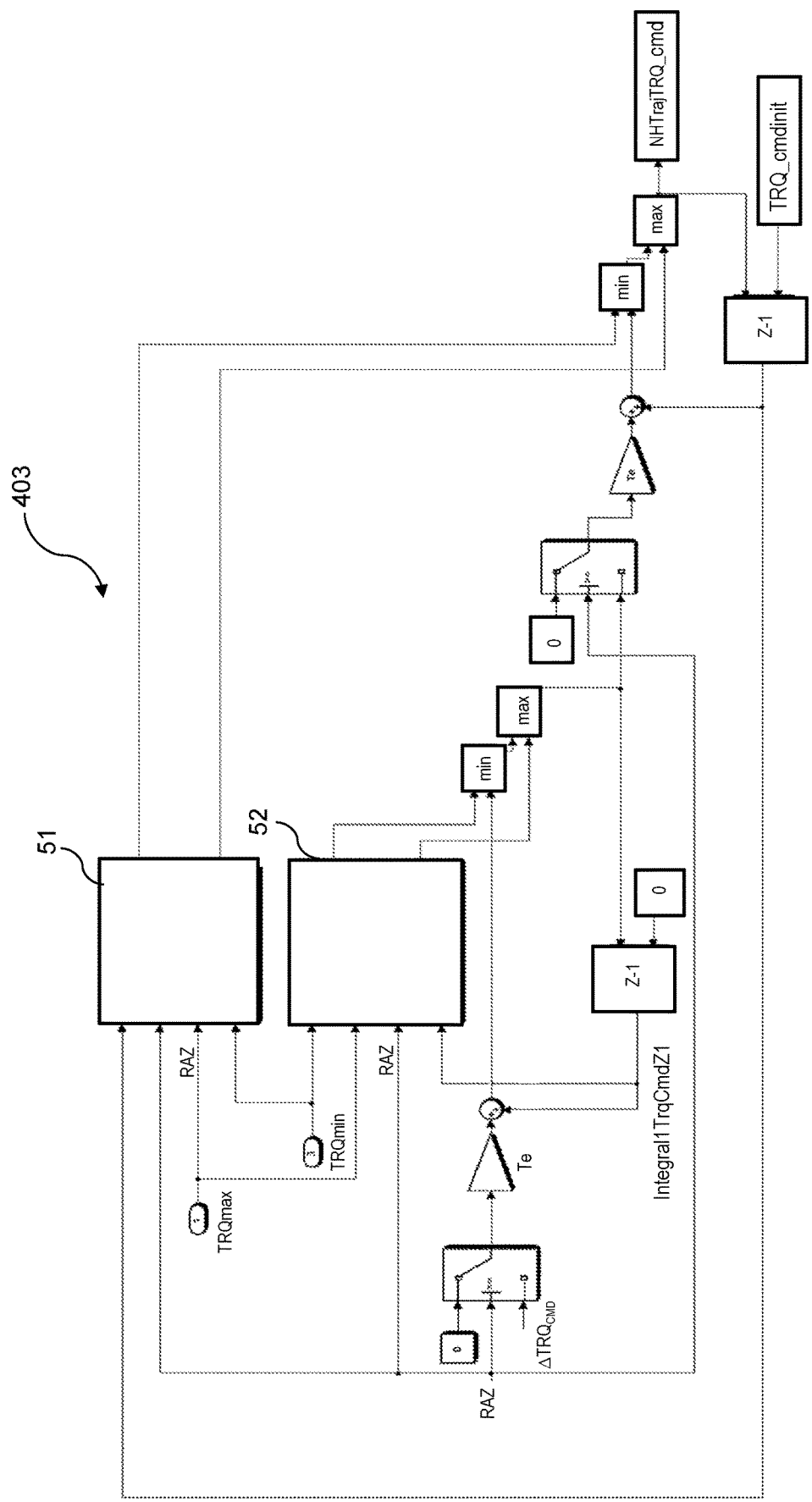
FIG. 8 is a schematic representation of an integration module of the second torque regulation loop of FIG. 7

An example of an integration module 403 is represented in detail in FIG. 8. In this example of implementation, the integration module 403 allows the torque set point $TRQ_{CMD}$ to be defined according to several ramps or gradients. With reference to FIG. 8, the integration module 403 contains two modules for calculating the saturation values of the integrators 51, 52.

As illustrated in FIG. 8, the two calculation modules 51, 52 will be saturated in order to fulfill the maximum torque $TRQ_{MAX}$ limitations and minimum torque $TRQ_{MIN}$ limitations related to the constraints of the electric machine ME and also to avoid divergence of the calculation modules 51, 52 in case their requests are limited by the physical structure of the electric motor ME.

Each calculation module 51, 52 comprises a zero reset RAZ input in order to gradually reduce the value of the torque set point $TRQ_{CMD}$.

Indeed, the additional or deficit mechanical torque set point $TRQ_{CMD}$ has to be suppressed once the transient is over. Indeed, the torque used for a transient cannot be maintained because it no longer necessarily corresponds to a current need and would generate undesired excessive power consumption.

By way of example, in the case of deceleration, the second torque loop B2 imposes a resistive torque $TRQ_{CMD}$ in order to allow the speed NH to drop according to the determined trajectory, the turbomachine T reaches idle speed at the end of the transient. If the resistive torque $TRQ_{CMD}$ is maintained during deceleration on the stabilized idle phase, the fuel then required to maintain idle will have to compensate unnecessarily for this resistive torque which is no longer useful on this operation phase. Efficiency would then be penalized. This reasoning applies in an acceleration end phase as well as in a phase in which acceleration and deceleration alternate.

As illustrated in FIG. 7, the zero reset RAZ indicator allows each of the integrators 51, 52 to be zero reset when activated. However, in order to avoid disturbance of the speed NH due to the electrical torque TRQ being suppressed too quickly, the torque set point $TRQ_{CMD}$ is reduced slowly according to a predetermined gradient, in this example a reduction gradient QKGS (not represented). In practice, in this example, the values of the integrators are stored and are gradually zero reset as a function of the past values. When the zero reset RAZ indicator is no longer to zero, the values of the integrators start to increase again.

Advantageously, the reduction gradient QKGS is predetermined as a function of the response time of the first fuel loop B1, the response time being obtained by test and simulation. Thus, the integration module 403 of the second torque loop B2 reduces its influence on the speed NH, which advantageously allows the first fuel loop B1 to adapt the fuel set point $Q_{CMD}$ effectively, since the electrical torque being fed has allowed the operating point to deviate from the limits $Q_{MAX}$, $Q_{MIN}$. The compensation achieved by the first fuel loop B1 is natural and controlled.

In other words, the second torque loop B2 relieves the first fuel loop B1 during a transient. The torque set point $TRQ_{CMD}$ is thus zero reset when the conditions for activating torque regulation have disappeared.

Suppressing the torque set point TRQ fed by the electric machine ME has to be simultaneously compensated for by adapting the fuel set point $Q_{CMD}$, otherwise a disturbance of the speed NH would be systematic. Advantageously, adapting the fuel set point $Q_{CMD}$ is automatic and it is not necessary to calculate new indicators in the second torque loop B2 for the first fuel loop B1.

An example of implementation of a turbomachine control method wherein a fuel flow set point $Q_{CMD}$ and an electrical torque set point $TRQ_{CMD}$ are determined will now be set forth.

Figure 9:
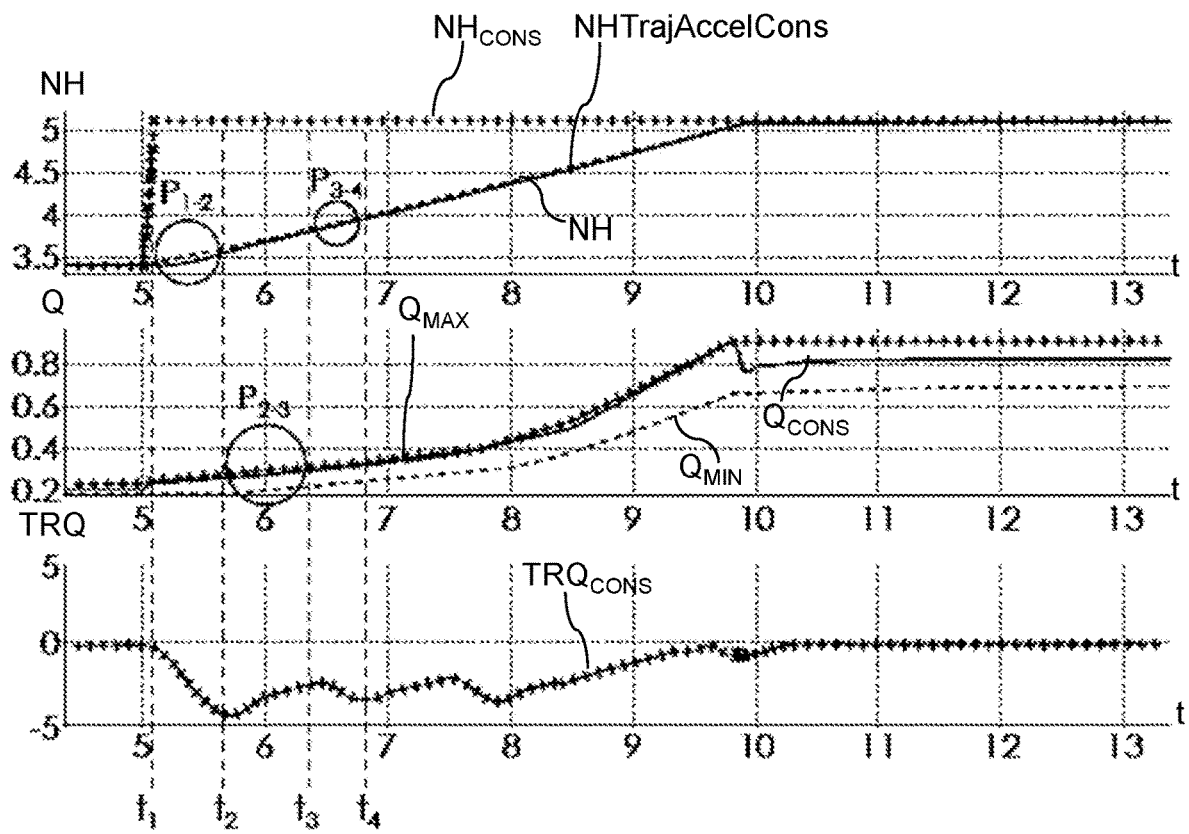
FIG. 9 is a schematic representation of the increase in engine speed, fuel flow set point and torque set point as a result of a pilot's acceleration command according to the invention.

In this example of implementation, the pilot handles the control lever to increase the speed of the turbomachine T at a time t1=5 seconds as illustrated in FIG. 9.

The first regulation loop B1 detects a speed transient via the transient intent detection module 302 and emits an indicator of acceleration transient request TopAccel. Similarly, the speed trajectory generation module 303 determines a speed set point for acceleration (acceleration trajectory) NHTrajAccelCons. As illustrated in FIG. 9, the acceleration trajectory is in the form of a slope. In addition, stop management module 306 limits the value of the fuel flow set point $Q_{CMD}$ and defines an acceleration stop set point TopStopAccel that imposes a maximum fuel set point $Q_{MAX}$.

During the period P1-2, defined between times t1 and t2, the current speed NH is lower than the acceleration trajectory set point NHTrajAccelCons because the fuel set point $Q_{CMD}$ is limited by the maximum fuel set point $Q_{MAX}$.

During this period P1-2, the torque set point $TRQ_{CMD}$ gradually increases (by convention in FIG. 9, a torque increase has a negative value) until time t2. As the torque set point $TRQ_{CMD}$ increases, the current speed NH increases due to the additional electrical torque and allows the acceleration trajectory NHTrajAccelCons to be followed reactively, which is very advantageous. Furthermore, as the torque set point $TRQ_{CMD}$ increases, the fuel set point $Q_{CMD}$ deviates from the maximum fuel set point $Q_{MAX}$, thus providing a regulation range for the fuel set point $Q_{CMD}$ that is no longer restricted.

Also, during the period P2-3, defined between times t2 and t3, the first fuel loop B1 allows the fuel set point $Q_{CMD}$ to be adapted so that the current speed NH will reactively follow the acceleration trajectory NHTrajAccelCons. As the fuel set point $Q_{CMD}$ is deviated from the maximum fuel set point $Q_{MAX}$, the acceleration stop set point TopStopAccel is no longer activated. Also, zero resetting the torque set point $TRQ_{CMD}$ can be implemented over the period P2-3. As illustrated in FIG. 9, zero resetting is performed gradually so as not to abruptly reduce the current speed NH and allow the first fuel loop B1 to take over for regulation.

At time t3, similarly to time t1, the fuel set point Qcmp is limited by the maximum fuel set point $Q_{MAX}$. The acceleration stop set point TopStopAccel is then activated, inhibiting the zero reset of the torque set point $TRQ_{CMD}$ which increases again. At time t3, the torque set point $TRQ_{CMD}$ did not have time to be cancelled. Similarly, over the period P3-4, defined between times t3 and t4, the current speed NH is lower than the acceleration trajectory set point NHTrajAccelCons because the fuel set point $Q_{CMD}$ is limited by the maximum fuel set point $Q_{MAX}$. The torque set point $TRQ_{CMD}$ gradually increases until time t4.

By virtue of the invention, the electric motor ME is used sparingly to allow optimum trajectory following, offering a margin of regulation for the fuel set point $Q_{CMD}$. The first fuel loop B1 and the second torque loop B2 are implemented synergistically to optimize following of the speed trajectory and thus improve operability of the turbomachine T.

It goes without saying that only some of these indicators could be used. Similarly, it goes without saying that other indicators could be used to refine torque set point regulation.

The invention claimed is:

1. A method for controlling a turbomachine comprising a fan positioned upstream of a gas generator and delimiting a primary airflow and a secondary airflow, the primary airflow passing through said gas generator which comprises a low-pressure compressor, a high-pressure compressor, a combustion chamber, a high-pressure turbine and a low-pressure turbine, said low-pressure turbine being connected to said low-pressure compressor by a low-pressure rotation shaft and said high-pressure turbine being connected to said high-pressure compressor by a high-pressure rotation shaft, the turbomachine comprising an electric motor forming a torque injection device on the high-pressure rotation shaft, method wherein a fuel flow set point $Q_{CMD}$ in the combustion chamber and a torque set point $TRQ_{CMD}$ provided to the electric motor are determined, the control method comprising:
- a step of implementing a first fuel regulation loop in order to determine the fuel flow set point $Q_{CMD}$ comprising:
  i. a step of detecting a speed transient intent TopAccel, TopDecel as a function of a difference between a current speed NH and a determined set point speed $NH_{CONS}$,
  ii. a step of determining a transient speed set point NHTrajAccelCons, NHTrajDecelCons,
  iii. a step of determining a fuel correction quantity $\Delta Q_{CMD}$ as a function of the transient speed set point NHTrajAccelCons, NHTrajDecelCons; and
  iv. a step of determining the fuel flow set point $Q_{CMD}$ as a function of the fuel correction quantity $\Delta Q_{CMD}$
- a step of implementing a second torque regulation loop in order to determine the torque set point $TRQ_{CMD}$ comprising
  i. a step of determining a torque correction quantity $\Delta TRQ_{CMD}$ as a function of the transient speed set point NHTrajAccelCons, NHTrajDecelCons, and
  ii. a step of determining the torque set point $TRQ_{CMD}$ as a function of the torque correction quantity $\Delta TRQ_{CMD}$.

2. The control method according to claim 1, comprising: during the step of implementing the first fuel regulation loop, a step of detecting a fuel set point stop TopButeeAccel, TopButeeDecel,
during the step of implementing the second torque regulation loop, a step of zero resetting the torque set point $TRQ_{CMD}$, the step of zero resetting the torque set point $TRQ_{CMD}$ being inhibited in the case of detection of a speed transient intent TopAccel, TopDecel and detection of a fuel set point stop TopButeeAccel, TopButeeDecel.

3. The control method according to claim 2, wherein the torque set point $TRQ_{CMD}$ is gradually zero reset.

4. The control method according to claim 3, wherein the reduction gradient is a function of the response time of the first fuel regulation loop.

5. The control method according to claim 1, comprising a step of doubly integrating the torque correction quantity $\Delta TRQ_{CMD}$ in order to determine the torque set point $TRQ_{CMD}$.

6. The control method according to claim 1, wherein the torque set point $TRQ_{CMD}$ is bounded between a maximum torque value $TRQ_{max}$ determined by the structure of the electric motor ME and a minimum torque value $TRQ_{min}$ determined by the structure of the electric motor ME.

7. A computer program comprising instructions for executing the steps of the control method according to claim 1 when said program is executed by a computer.

8. An electronic control unit for a turbomachine comprising a memory comprising instructions of the computer program according to claim 7.

9. A turbomachine comprising the electronic unit according to claim 8.

* * * * *